(12) United States Patent
Ishikawa et al.

(10) Patent No.: US 9,321,123 B2
(45) Date of Patent: Apr. 26, 2016

(54) SPOT WELDING ELECTRODE REMOVAL APPARATUS

(71) Applicant: KYOKUTOH CO., LTD., Aichi (JP)

(72) Inventors: Seiji Ishikawa, Aichi (JP); Hirokazu Kusano, Aichi (JP)

(73) Assignee: Kyokutoh Co., Ltd., Aichi (JP)

( * ) Notice: Subject to any disclaimer, the term of this patent is extended or adjusted under 35 U.S.C. 154(b) by 141 days.

(21) Appl. No.: 14/299,438

(22) Filed: Jun. 9, 2014

(65) Prior Publication Data

US 2014/0291299 A1    Oct. 2, 2014

Related U.S. Application Data

(63) Continuation of application No. PCT/JP2013/002058, filed on Mar. 26, 2013.

(51) Int. Cl.
*B23K 11/30* (2006.01)
*B23K 11/11* (2006.01)

(52) U.S. Cl.
CPC ........... *B23K 11/3072* (2013.01); *B23K 11/115* (2013.01)

(58) Field of Classification Search
CPC .................... B23K 11/3072; B23K 11/115
See application file for complete search history.

(56) References Cited

U.S. PATENT DOCUMENTS

| 4,935,595 | A | | 6/1990 | Fuse | |
|---|---|---|---|---|---|
| 6,049,053 | A | * | 4/2000 | Shimada | B23K 11/3072 219/86.1 |
| 6,188,038 | B1 | | 2/2001 | Kazuhiro | |
| 6,518,537 | B1 | | 2/2003 | Tezawa | |
| 7,966,706 | B2 | * | 6/2011 | Fukizawa | B23K 11/3072 269/903 |
| 2010/0236060 | A1 | | 9/2010 | Suzuki | |

FOREIGN PATENT DOCUMENTS

| CN | 201223995 Y | 4/2009 |
|---|---|---|
| CN | 102019499 A | 4/2011 |
| JP | 01-202379 A | 8/1989 |

(Continued)

OTHER PUBLICATIONS

International Search Report for corresponding International Application No. PCT/JP2013/002058 mailed Jun. 25, 2013.

(Continued)

*Primary Examiner* — Geoffrey S Evans
(74) *Attorney, Agent, or Firm* — Renner, Otto, Boisselle & Sklar, LLP

(57) ABSTRACT

A spot welding electrode removal apparatus that is compact and durable is provided. Specifically, the apparatus includes a J-shaped operating lever, and in a position adjacent to the end of the operating lever and facing the contact member, a pressing member is provided. The operating lever is pivotably supported at a portion of the operating lever closer to the end of the operating lever than the pressing member is by a portion of the rotating case adjacent to the side of the contact member. The electrode is placed between the contact member and the pressing member, and a pivotal operation of the operating lever toward the electrode allows the pressing member and the contact member to sandwich the electrode, and a further pivotal operation of the operating lever toward the electrode allows the electrode to rotate together with the rotating case, thereby removing the electrode from a shank end.

5 Claims, 6 Drawing Sheets

(56) References Cited

FOREIGN PATENT DOCUMENTS

| | | | |
|---|---|---|---|
| JP | 08-281449 A | | 10/1996 |
| JP | 2000-015455 A | | 1/2000 |
| JP | 2000-094152 A | | 4/2000 |
| JP | 2001-334370 A | | 12/2001 |
| JP | 2002-283062 A | * | 10/2002 |
| JP | 2004-066252 A | | 3/2004 |
| JP | 2004-216400 A | | 8/2004 |
| JP | 2009-262201 A | * | 11/2009 |
| JP | 2009-262201 A | | 11/2009 |
| JP | 2009-297752 A | | 12/2009 |
| JP | 2010-221231 A | | 10/2010 |
| JP | 2011-125873 A | * | 6/2011 |
| JP | 2011-183422 A | * | 9/2011 |
| JP | 2012-040600 A | | 3/2012 |
| KR | 10-1138559 B1 | | 5/2012 |

OTHER PUBLICATIONS

Form PCT/ISA/237 for corresponding International Application No. PCT/JP2013/002058 dated Jun. 25, 2013.

* cited by examiner

SPOT WELDING ELECTRODE REMOVAL APPARATUS

CROSS-REFERENCE TO RELATED APPLICATION

This is a continuation of International Application No. PCT/JP2013/002058 filed on Mar. 26, 2013. The entire disclosure of this application is incorporated by reference herein.

BACKGROUND

The present disclosure relates to spot welding electrode removal apparatuses used in, for example, automobile production lines.

Conventionally, spot welding techniques of pressing electrode mounted on a shank end of a welding gun to steel plates, applying a pressure thereto, and causing energization to provide resistance heating to the steel plates to weld them together have been used in automobile production lines.

Deterioration of the condition of the above electrode results in deterioration of the quality of a welded part, and therefore, the electrode periodically has to be removed from a shank to exchange the electrode for another one that is in an excellent condition. In automobile production lines, an electrode is generally removed from a shank by a spot welding electrode removal apparatus, and for example, in a spot welding electrode removal apparatus disclosed in Japanese Patent Publication No. 2009-262201 (Paragraphs [0038]-[0051] and FIGS. 4 and 7), a disk-shaped rotor is rotatably provided around the center of rotation of the apparatus, the electrode is placed such that the center of the electrode coincides with the center of rotation of the rotor. The rotor is provided with a contact part that contacts part of an outer peripheral surface of the electrode. In the rotor, a linear operating lever is fixed to extend along a radial direction and face the contact part so that a position in which the electrode is set is between the operating lever and the contact part. When the electrode is provided between the contact part and the operating lever, and the operating lever is operated to allow the rotor to rotate in one direction, an end of the operating lever adjacent to the contact part presses with force a portion of an outer peripheral surface of the electrode away from the contact part to sandwich the electrode with the contact part, and the operating lever is further operated to allow the electrode to rotate in one direction together with the rotor, whereby the electrode is removed from the shank end.

SUMMARY

However, in the spot welding electrode removal apparatus disclosed in Japanese Patent Publication No. 2009-262201 (Paragraphs [0038]-[0051] and FIGS. 4 and 7), when an electrode rotates with respect to the shank, a large bending moment is applied to the operating lever due to a frictional resistance between the electrode and the end of the operating lever adjacent to the contact part. Therefore, repeated removal of the electrode causes deformation or damage of the operating lever, and due to such deformation or damage, the electrode may not be removed.

In order to avoid the above failure of the removal, a cross-sectional area of the operating lever may be increased to increase the second moment of area to improve stiffness. However, the mere increase of the cross-sectional area of the operating lever causes an increase in size of the entire apparatus.

The present disclosure has been developed in view of the above problems. It is an object of the present disclosure to provide a spot welding electrode removal apparatus that is compact and durable.

In order to attain the above object, the present disclosure is characterized by devising the shape of the operating lever.

Specifically, the present disclosure is directed to a spot welding electrode removal apparatus that removes electrode mounted on a shank end of a spot welding gun from the shank end, and the following solving means are captured.

According to a first aspect of the present disclosure, the spot welding electrode removal apparatus includes: a rotor rotatably provided around a center of rotation of the apparatus, the electrode being placed such that a center of the electrode coincides with a center of rotation of the rotor; a contact part provided in the rotor to contact a part of an outer peripheral surface of the electrode; and a J-shaped operating lever including a pressing part pressing the electrode, the pressing part being located in a position adjacent to an end of the operating lever and facing the contact part, the operating lever being pivotably supported at a portion of the operating lever closer to the end of the operating lever than the pressing part is by a portion of the rotor adjacent to the side of the contact part, wherein the electrode is placed between the contact part and the pressing part, and a pivotal operation of the operating lever toward the electrode allows the pressing part to press a portion of the outer peripheral surface of the electrode located away from the contact part to sandwich the electrode between the pressing part and the contact part, and a further pivotal operation of the operating lever toward the electrode allows the electrode to rotate together with the rotor, thereby removing the electrode from the shank end.

In a second aspect of the present disclosure related to the first aspect of the invention, the operating lever includes a body and the pressing part, and the pressing part is detachable from the body.

In a third aspect of the present disclosure related to the first or second aspect of the invention, the end of the operating lever includes a pressing projection pressing a side surface of the electrode to release loose engagement of the electrode with the contact part when the operating lever pivots toward a side away from the electrode to allow the pressing part to be apart from the electrode.

In a fourth aspect of the present disclosure related to any one of the first through the third aspects of the invention, the rotor serves as a rotating case which includes an electrode insertion hole corresponding to a space between the contact part and the pressing part, and in which the contact part and a portion of the operating lever adjacent to the end of the operating lever are placed, and
a plurality of drain holes are formed in the rotating case to drain water having flown into the rotating case.

In a fifth aspect of the present disclosure related to any one of the first through the third aspects of the invention, at least one of a surface of a portion of the operating lever adjacent to the end of the operating lever or a surface of the contact part is treated by tri-nickel plating or coated by cationic electrodeposition.

In the first aspect of the present disclosure, the portion of the operating lever adjacent to the end of the operating lever is bent along the outer peripheral surface of the electrode. Therefore, the second moment of area of the portion of the operating lever adjacent to the end of the operating lever is increased, and even if the electrode is repeatedly removed, deformation or damage of the operating lever can be prevented. It is unnecessary to increase the size of the structure of the portion of the operating lever adjacent to the end of the operating lever in the radial direction or the direction of the center of rotation of the rotor in order to increase the second moment of area of the portion of the operating lever adjacent to the end of the operating lever, and therefore, the whole of the electrode removal apparatus can have a compact structure.

In the second aspect of the present disclosure, even if the repeated removal of the electrode deteriorates the condition of the pressing part, only the pressing part that is one of the elements of the operating lever may be partially exchanged for another one, and the whole of the operating lever does not need to be exchanged for another one, and the cost of the parts is reduced, and the maintenance of the electrode removal apparatus is easy.

In the third aspect of the present disclosure, even if the electrode is loosely engaged with the contact member after the electrode is removed, the pressing projection presses the electrode from the side of the electrode, thereby removing the electrode from the contact member, and therefore, the loose engagement of the electrode with the contact member can be prevented from being continuously maintained.

In the fourth aspect of the present disclosure, the portion of the operating lever adjacent to the end of the operating lever is less likely to become dirty due to, e.g., dust inside the factory, and therefore, breakdown of the apparatus due to dirt can be prevented. When the electrode is exchanged for another one, even if cooling water is leaked from the spot welding gun into the inside of the rotating case, the cooling water is drained from the respective drain holes to the outside of the rotating case, and therefore, corrosion of the contact member and the operating lever due to the cooling water can be prevented.

In the fifth aspect of the present disclosure, the operating lever is less likely to be rusted, and the breakdown of the electrode removal apparatus due to corrosion of the operating lever can be reliably prevented.

DETAILED DESCRIPTION

An embodiment of the present disclosure will be described in detail hereinafter with reference to the drawings. The following explanations of a preferred embodiment are substantially mere examples.

Figure 1:
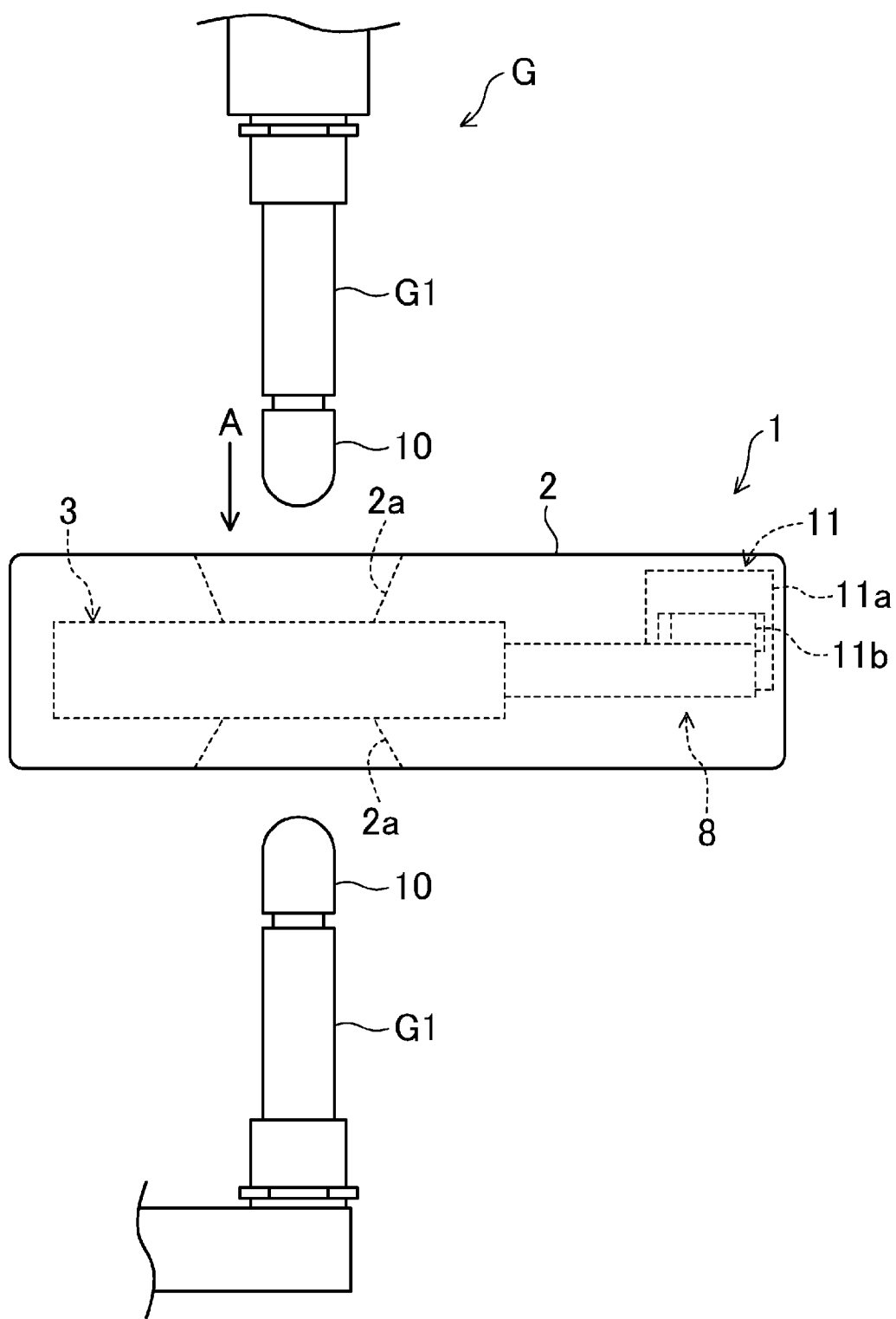
FIG. 1 is a front view of a spot welding electrode removal apparatus according to an embodiment of the present disclosure.

FIG. 1 illustrates a spot welding electrode removal apparatus 1 according to the embodiment of the present disclosure. The electrode removal apparatus 1 is configured to, in welding guns G used when steel plates are welded together by spot welding, remove electrodes 10 mounted on respective ends of a pair of an upper and a lower shanks G1 of the welding guns G from the respective shanks G1.

The electrode removal apparatus 1 includes a casing 2 in the shape of a flat rectangular parallelepiped, and an apparatus body 3 accommodated inside the casing 2, and the casing 2 is provided with a pair of an upper and a lower through holes 2a for inserting the respective electrodes 10 into the casing 2.

Figure 2:
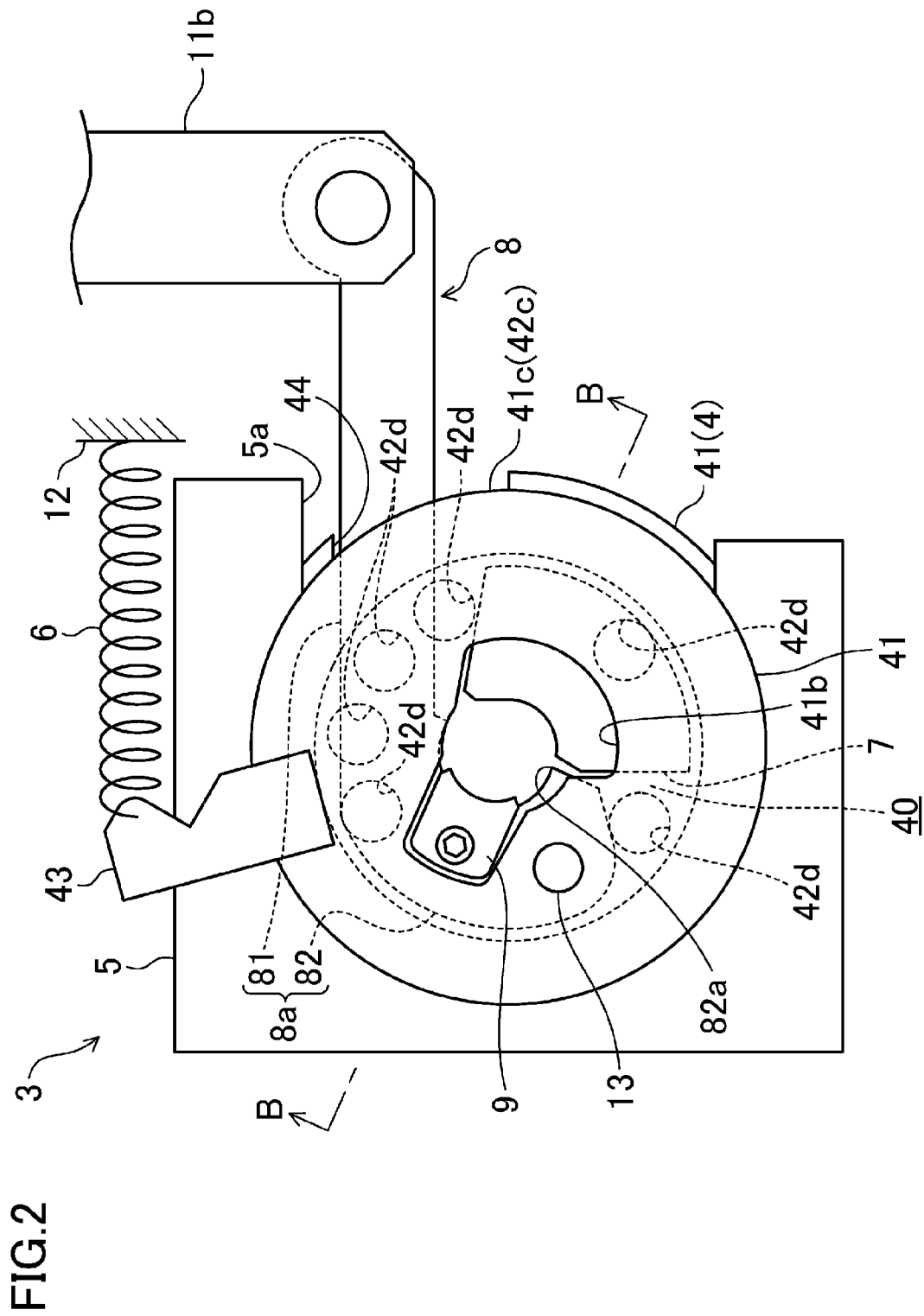
FIG. 2 illustrates the inside of the apparatus when viewed from arrow A of FIG. 1.
Figure 3:
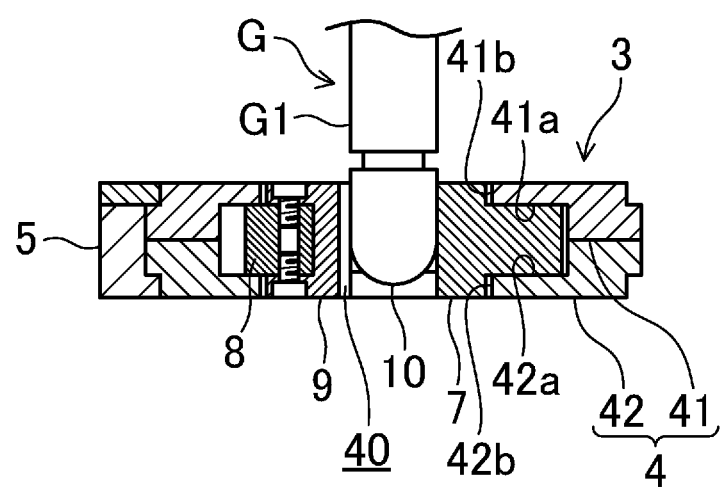
FIG. 3 is a cross-sectional view taken along the line B-B of FIG. 2.
Figure 4:
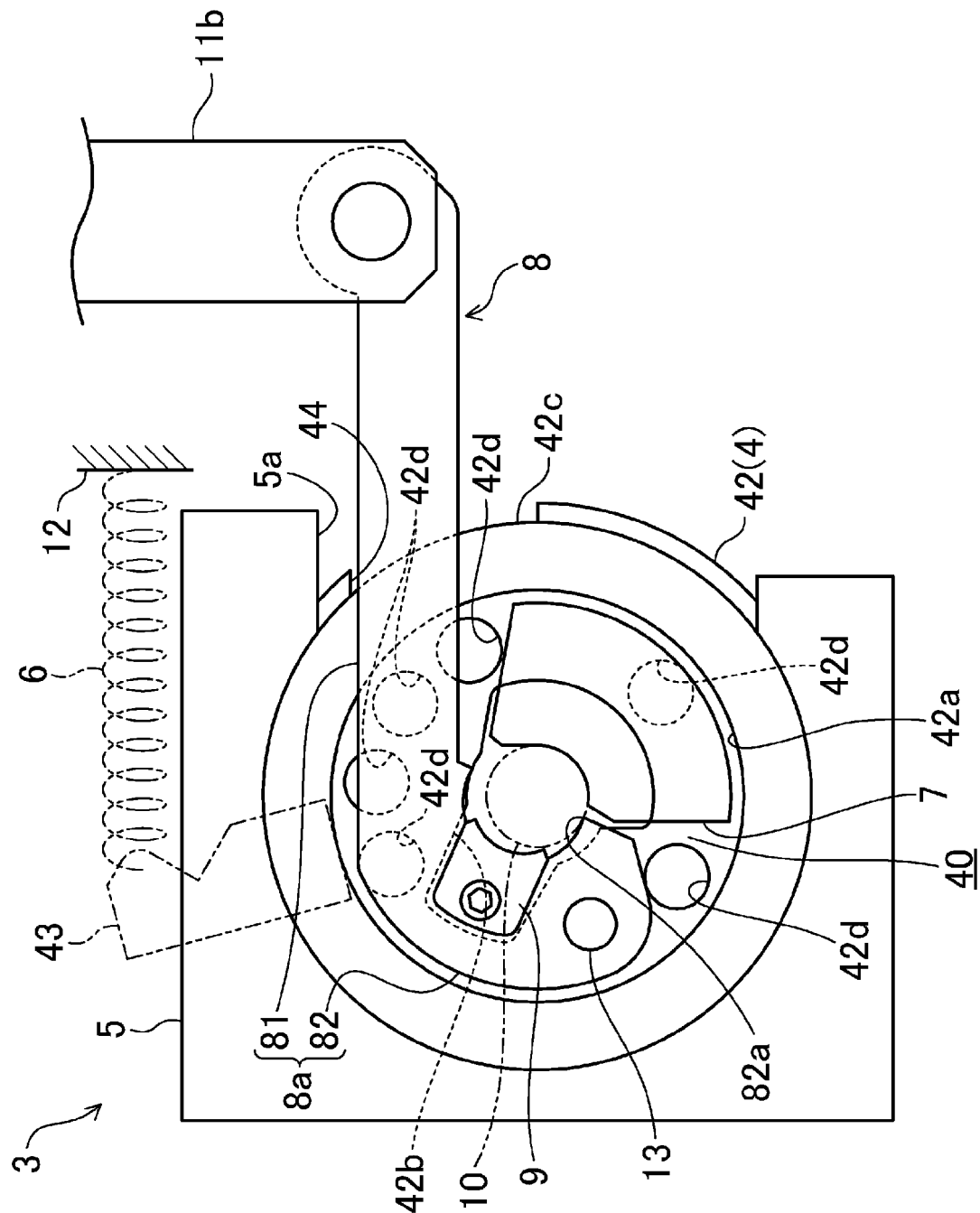
FIG. 4 is a view corresponding to FIG. 2 when an upper case is removed, and illustrates a state immediately before an electrode is removed from a shank end.

As illustrated in FIGS. 2-4, the apparatus body 3 includes a rotating case (rotor) 4 made of iron and having a substantially disk shape, and a support frame 5 having a U shape in plan view and having an opening 5a that is open to the side thereof.

The inner surface of the support frame 5 corresponds to the outer peripheral surface of the rotating case 4, and the rotating case 4 is accommodated inside the support frame 5 so as to be rotatable around a central axis (the center of rotation).

The rotating case 4 is divided into an upper case 41 located at an upper position and a lower case 42 located at a lower position at a substantially central position in the vertical direction.

The upper case 41 has a first recess 41a that is downwardly open, and at the center of the first recess 41a, an electrode insertion hole 41b is formed to insert the electrode 10 thereinto.

In a portion of the outer periphery of the upper case 41 corresponding to the opening 5a of the support frame 5, a first notch 41c is formed.

The lower case 42 has a second recess 42a that is upwardly open, and at the center of the second recess 42a, an electrode insertion hole 42b is formed to insert the electrode 10 thereinto so as to face the electrode insertion hole 41b.

In a portion of the outer periphery of the lower case 42 corresponding to the first notch 41c, a second notch 42c is formed, and in the vicinity of the electrode insertion hole 42b, a plurality of drain holes 42d for draining water having flown into the rotating case 4 are formed.

The rotating case 4 is assembled by allowing the opening edge of the upper case 41 and the opening edge of the lower case 42 to be flush with each other, and the first recess 41a and the second recess 42a forms a housing 40, and the first notch 41c and the second notch 42c forms a case opening 44.

In a portion of the outer periphery of the upper case 41 closer to the opening 5a, an extension plate 43 is provided to radially outwardly extend from the rotating case 4.

One end of a coil spring 6 is coupled to the extending end of the extension plate 43, and the other end of the coil spring 6 is coupled to a side 12 fixing the apparatus. The coil spring 6 is compressed between the extension plate 43 and the side 12 fixing the apparatus, and the coil spring 6 rotationally biases the rotating case 4 in a counterclockwise direction when viewed from above.

In a portion of the rotating case 4 adjacent to the opening 5a, a contact part having a fan-shape when viewed in plan is provided. The contact part is made of iron and provided to be independently of the rotating case 4 in the embodiment, and detachably fixed to the rotating case 4, and the surface of the contact part is treated by tri-nickel plating. The contact part is hereinafter referred to as a contact member 7.

As illustrated in FIG. 3, the cross-section of the contact member 7 is a T-shape, and the cross-section of the inner portion of the contact member 7 is larger than that of the outer portion of the contact member 7, and the inner portion of the contact member 7 is inserted into the electrode insertion holes 41b and 42b, and is substantially flush with the upper surface of the upper case 41 and the lower surface of the lower case 42.

On the inner surface of the contact member 7, a plurality of sharp, slip-resistant projections, which are not illustrated, are formed around the center of rotation of the rotating case 4.

The apparatus body 3 is provided with an operating lever 8 which is made of iron and the entire surface of which is treated by tri-nickel plating, and the operating lever 8 has a body 8a having a J shape in plan view.

The body 8a includes a linear portion 81, and a curved portion 82 continuously formed with one end of the linear portion 81, and one end of the operating lever 8 is housed inside the housing 40, and the other end of the linear portion 81 outwardly extends from the case opening 44 to the outside of the rotating case 4.

A pressing part for pressing the electrode 10 is provided in the inner peripheral side of the curved portion 82, thus, in a position adjacent to the one end of the operating lever and facing the contact member 7. The pressing part is made of iron and provided to be independently of the body 8a in the embodiment, is detachably fixed to the body 8a, and faces the contact member 7 within the electrode insertion holes 41b and 42b. The pressing part is hereinafter referred to as a pressing member 9.

The pressing member 9 has a U-shaped cross-section and is attached to the operating lever 8, and the upper and lower portions thereof are inserted into the electrode insertion holes 41b and 42b and are substantially flush with the upper surface of the upper case 41 and the lower surface of the lower case 42.

On a surface of the pressing member 9 facing the contact member 7, a plurality of sharp, slip-resistant projections, which are not illustrated, are formed around the center of rotation of the rotating case 4.

The operating lever 8 is pivotably supported at a portion of the operating lever 8 closer to the end of the operating lever 8 than the pressing member 9 is by a pivot axis 13 vertically extending toward a portion of the rotating case 4 adjacent to the contact member 7.

In the end of the operating lever 8 (the end of the curved portion 82), a pressing projection 82a is formed to press the side surface of the electrode 10 to release loose engagement of the electrode 10 with the contact member 7 when the operating lever 8 pivots toward a side away from the electrode 10 to allow the pressing member 9 to be apart from the electrode 10.

The apparatus body 3 is provided with a fluid-pressure cylinder 11 extending in a horizontal direction and intersecting the linear portion 81 of the operating lever 8.

The fluid-pressure cylinder 11 has a tubular cylinder body 11a, and a piston rod 11b extending outwardly from one end of the cylinder body 11a in the longitudinal direction.

The end of the piston rod 11b is connected to the base end of the linear portion 81. When the piston rod 11b moves forward due to an extension operation of the fluid-pressure cylinder 11, the operating lever 8 pivots against biasing force of the coil spring 6 toward the electrode 10, and when the piston rod 11b moves back due to a shrink operation of the fluid-pressure cylinder 11, biasing force of the coil spring 6 allows the operating lever 8 to pivot toward a side away from the electrode 10.

When the electrodes 10 are removed, the electrodes 10 are inserted from the respective electrode insertion hole 41b and 42b so as not to contact the pressing projection 82a, and the center of the electrode 10 coincides with the center of rotation of the rotating case 4, whereby the electrode 10 is placed between the contact member 7 and the pressing member 9. The inner surface the contact member 7 contacts a part of the outer peripheral surface of the electrode 10 set in the housing 40.

Figure 5:
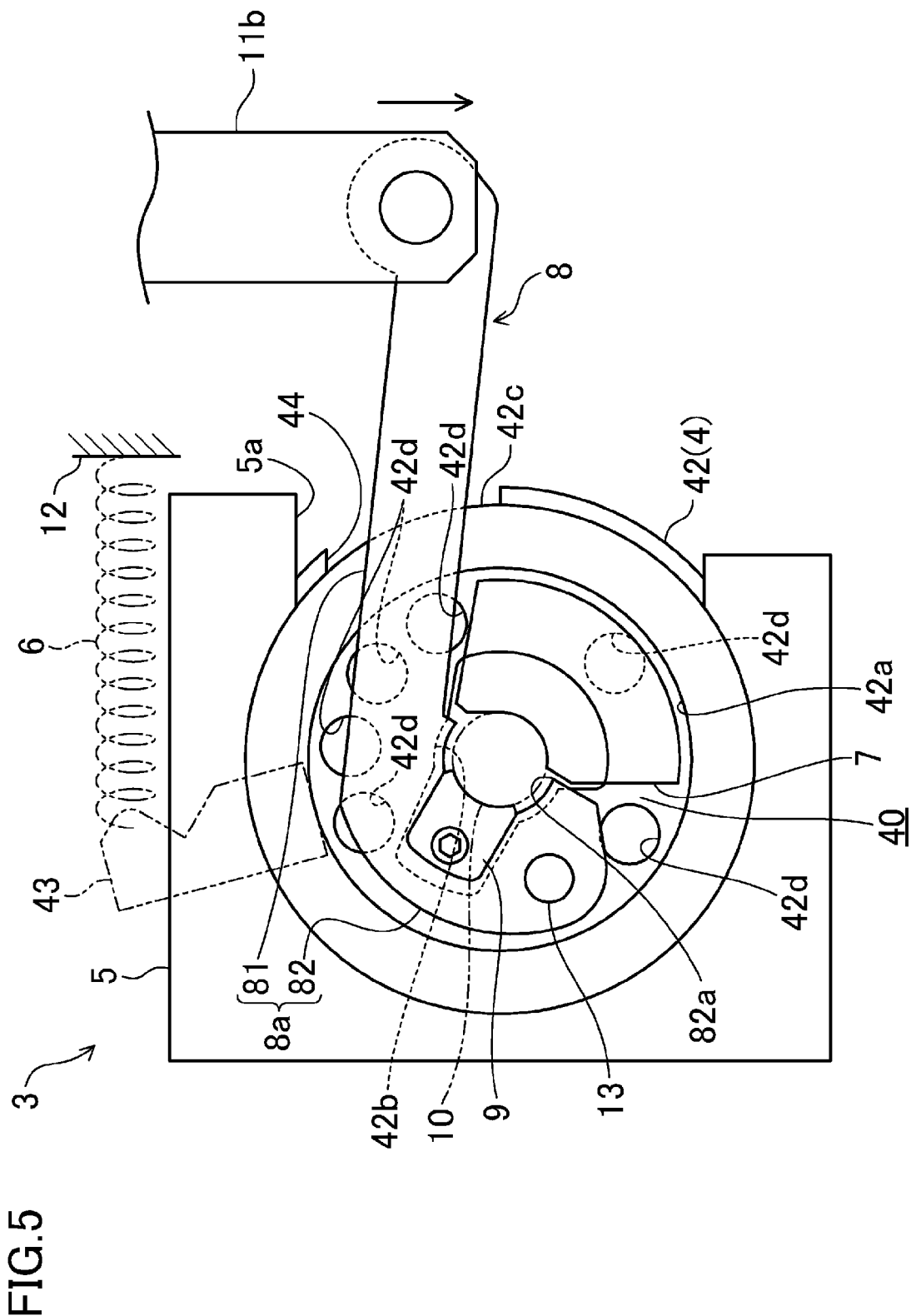
FIG. 5 is illustrates a state immediately after an operating lever pivots from the state of FIG. 4.
Figure 6:
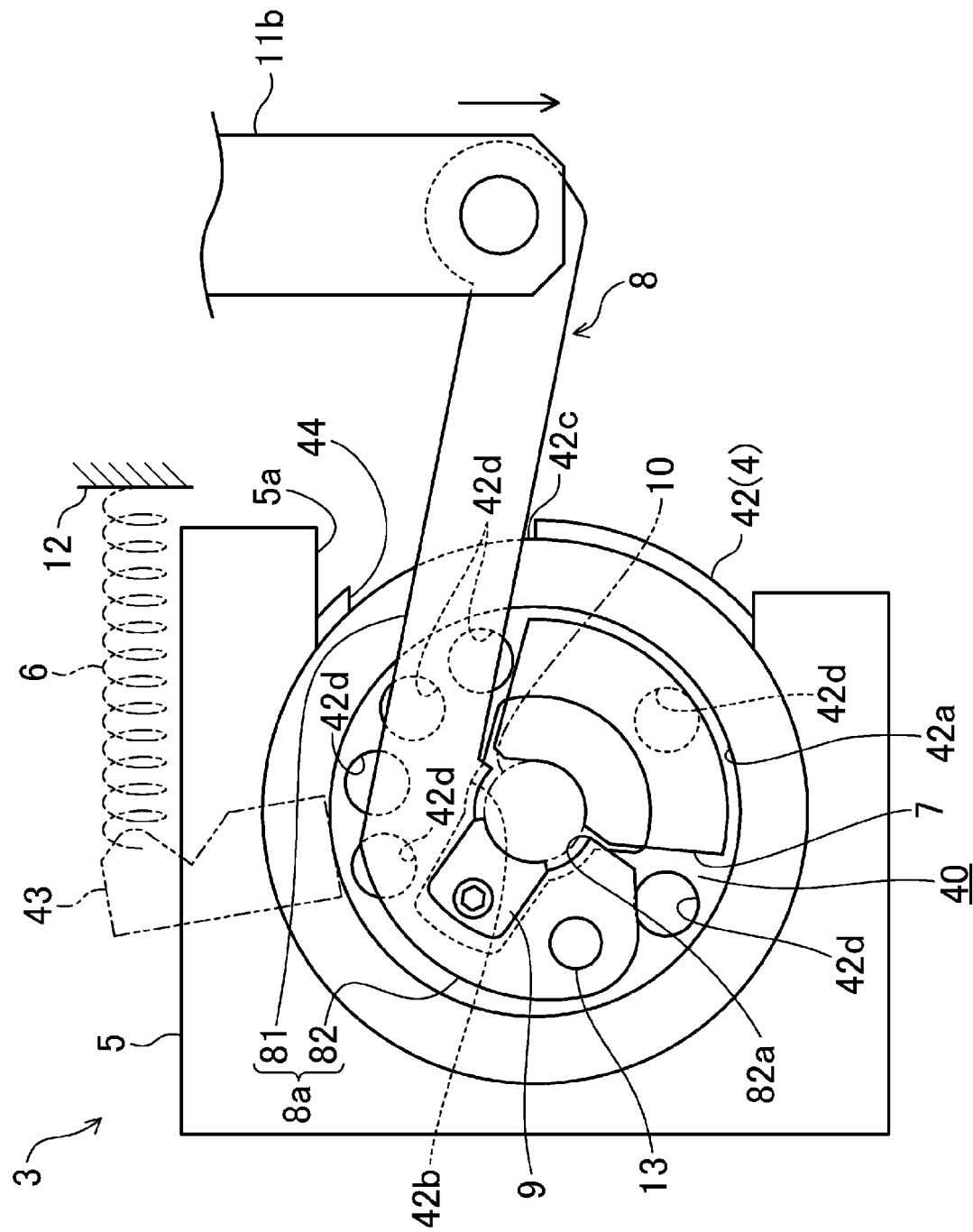
FIG. 6 is illustrates a state immediately after the operating lever further pivots from the state of FIG. 5, thereby removing the electrode from the shank end.

As illustrated in FIGS. 4-6, a pivotal operation of the operating lever 8 toward the electrode 10 allows the pressing member 9 to press a portion of the outer peripheral surface of the electrode 10 located away from the contact member 7 to sandwich the electrode 10 between the pressing member 9 and the contact member 7, and a further pivotal operation of the operating lever 8 toward the electrode 10 allows the electrode 10 to rotate together with the rotating case 4 against the biasing force of the coil spring 6, thereby removing the electrode 10 from the end of the shank G1. At this time, even if the electrode 10 is loosely engaged with the contact member 7, the pressing projection 82a presses the side surface of the electrode 10 to forcibly release the loose engagement of the electrode 10 with the contact member 7.

Next, the operation of removing the electrodes 10 from the shank G1 will be described.

First, the upper electrode mounted on the shank G1 is inserted into the electrode insertion hole 41b of the rotating case 4 through the through hole 2a of the casing 2 so as not to contact the pressing projection 82a, and the center of the electrode 10 is placed to coincide with the center of rotation of the rotating case 4, as illustrated in FIG. 4.

Next, the fluid-pressure cylinder 11 is extended to allow the piston rod 11b to move forward, thereby allowing the operating lever 8 to pivot toward the electrode. With this operation, as illustrated in FIG. 5, the pressing member 9 presses a portion of the outer peripheral surface of the electrode 10 away from the contact member 7 to sandwich the electrode 10 with the contact member 7. At this time, the rotating case 4 does not rotate in the clockwise direction because of the biasing force of the coil spring 6.

Furthermore, the fluid-pressure cylinder 11 is extended to allow the piston rod 11b to further move forward, thereby allowing the operating lever 8 to pivot toward the electrode 10. With this operation, as illustrated in FIG. 6, the electrode 10 rotates together with the rotating case 4 against the biasing force of the coil spring 6 and is removed from the shank G1.

Thereafter, the fluid-pressure cylinder 11 is shrinked to allow the piston rod 11b to move back, and allow the operating lever 8 to pivot toward the side away from the electrode 10, thereby allowing the pressing member 9 to be apart from the electrode 10. At this time, the pressing projection 82a of the operating lever 8 presses the side surface of the electrode 10, and therefore, even if the electrode 10 is loosely engaged with the contact member 7, the loose engagement of the electrode 10 with the contact member 7 is forcibly released.

The lower electrode 10 mounted on the shank G1 is removed from the shank G1 in the same manner as the upper electrode 10 mounted on the shank G1.

According to the embodiment of the present disclosure, the portion of the operating lever 8 adjacent to the end of the operating lever 8 is bent along the outer peripheral surface of the electrode 10, and therefore, the second moment of area of the portion of the operating lever 8 adjacent to the end of the operating lever 8 is increased, and even if the electrode 10 is repeatedly removed, deformation or damage of the operating lever 8 can be prevented. It is unnecessary to increase the size of the structure of the portion of the operating lever 8 adjacent to the end of the operating lever 8 in the radial direction or the direction of the center of rotation of the rotating case 4 in order to increase the second moment of area of the portion of the operating lever 8 adjacent to the end of the operating lever 8, and therefore, the whole of the electrode removal apparatus 1 can have a compact structure.

Even if the repeated removal of the electrode 10 deteriorates the condition of the pressing member 9, only the pressing member 9 that is one of the elements of the operating lever 8 may be partially exchanged for another one, and the whole of the operating lever 8 does not have to be exchanged for another one, and the cost of the parts is reduced, and the maintenance of the electrode removal apparatus 1 is easy.

Furthermore, even if the electrode 10 is loosely engaged with the contact member 7 after it is removed, the pressing projection 82a presses the electrode 10 from the side thereof, thereby removing the electrode 10 from the contact member 7, and therefore, the loose engagement of the electrode 10 with the contact member 7 can be prevented from being continuously maintained.

In addition, the contact member 7 and the portion of the operating lever 8 adjacent to the end of the operating lever 8 is less likely to become dirty due to, e.g., dust inside the factory, and therefore, breakdown of the electrode removal apparatus 1 due to dirt can be prevented. When the electrode 10 is exchanged for another one, even if cooling water is leaked from the spot welding gun G into the inside of the rotating case 4, the cooling water is drained from the respective drain holes 42d to the outside of the rotating case 4, and therefore, corrosion of the contact member 7 and the operating lever 8 due to the cooling water can be prevented.

The entire surface region of the operating lever 8 is treated by tri-nickel plating, and therefore, the operating lever 8 is less likely to be rusted, and the breakdown of the electrode removal apparatus 1 due to corrosion of the operating lever 8 can be reliably prevented.

In the present disclosure, the entire surface region of the contact member 7 and the entire surface region of the operating lever 8 are treated by tri-nickel plating. The entire surface region of the contact member 7 and the entire surface region of the operating lever 8 may be coated by cationic electrodeposition.

In the present disclosure, the entire surface region of the operating lever 8 is treated by tri-nickel plating. Only the portion of the operating lever 8 adjacent to the end of the operating lever 8 that is likely to contact water due to the structure of the apparatus may be treated by tri-nickel plating.

In the present disclosure, the contact member 7 and the operating lever 8 are treated by tri-nickel plating. At least one of the contact member 7 and the operating lever 8 may be treated by tri-nickel plating or coated by cationic electrodeposition.

In the embodiment of the present disclosure, the pressing member 9 is detachable from the operating lever 8. The pressing member 9 may be integrally formed with the operating lever 8.

In the embodiment of the present disclosure, the contact member 7 is detachable from the rotating case 4. The contact member 7 may be integrally formed with the rotating case 7.

In the embodiment of the present disclosure, the plurality of drain holes 42d are formed in only the lower case 42. A plurality of drain holes may also be formed in the upper case 41.

In the embodiment of the present disclosure, the electrode removal apparatus 1 is used such that the center of rotation of the rotating case 4 is along a vertical direction. The electrode removal apparatus 1 may be used such that the center of rotation of the rotating case 4 is along a horizontal direction.

The present disclosure is suitable for a spot welding electrode removal apparatus used in, for example, automobile production lines.

The invention claimed is:

1. A spot welding electrode removal apparatus that removes an electrode mounted on a shank end of a spot welding gun from the shank end, the apparatus comprising:
   a rotor rotatably provided around a center of rotation of the apparatus, the electrode being placed such that a center of the electrode coincides with a center of rotation of the rotor;
   a contact part provided in the rotor to contact a part of an outer peripheral surface of the electrode; and
   a J-shaped operating lever including a pressing part pressing the electrode, the pressing part being located in a position adjacent to an end of the operating lever and facing the contact part, the operating lever being pivotably supported at a portion of the operating lever closer to the end of the operating lever than the pressing part is by a portion of the rotor adjacent to the side of the contact part,
   wherein
   the electrode is placed between the contact part and the pressing part, and a pivotal operation of the operating lever toward the electrode allows the pressing part to press a portion of the outer peripheral surface of the electrode located away from the contact part to sandwich the electrode between the pressing part and the contact part, and a further pivotal operation of the operating lever toward the electrode allows the electrode to rotate together with the rotor, thereby removing the electrode from the shank end.

2. The spot welding electrode removal apparatus of claim 1, wherein
   the operating lever includes a body and the pressing part, and
   the pressing part is detachable from the body.

3. The spot welding electrode removal apparatus of claim 1, wherein
   the end of the operating lever includes a pressing projection pressing a side surface of the electrode to release loose engagement of the electrode with the contact part when the operating lever pivots toward a side away from the electrode to allow the pressing part to be apart from the electrode.

4. The spot welding electrode removal apparatus of claim 1, wherein
   the rotor serves as a rotating case which includes an electrode insertion hole corresponding to a space between the contact part and the pressing part, and in which the contact part and a portion of the operating lever adjacent to the end of the operating lever are placed, and
   a plurality of drain holes are formed in the rotating case to drain water having flown into the rotating case.

5. The spot welding electrode removal apparatus of claim 1, wherein
   at least one of a surface of a portion of the operating lever adjacent to the end of the operating lever or a surface of the contact part is treated by tri-nickel plating or coated by cationic electrodeposition.

* * * * *